United States Patent

[11] 3,597,618

| [72] | Inventors | Robert J. Jordan;<br>Ronald N. Phillips; Robert R. Shatzer, all of Lexington Park, Md. |
|---|---|---|
| [21] | Appl. No. | 850,499 |
| [22] | Filed | Aug. 15, 1969 |
| [45] | Patented | Aug. 3, 1971 |
| [73] | Assignee | The United States of America as represented by the Secretary of the Navy |

[54] GROUND BASE TARGET FOR TESTING ELECTRO-OPTICAL SENSORS IN THE INFRARED AND VISIBLE RANGE
10 Claims, 2 Drawing Figs.

[52] U.S. Cl. ............................................. 250/84,
250/85, 250/88
[51] Int. Cl. ............................................. G21h 3/00
[50] Field of Search ............................................. 250/84, 85, 88; 273/102, 105.2, 105.3, 127; 343/18

[56] References Cited
UNITED STATES PATENTS

| 3,227,879 | 1/1966 | Blau et al. | 250/84 |
| 3,295,132 | 12/1966 | Chapman, Jr. | 343/18 |
| 3,333,103 | 7/1967 | Barnes | 250/84 |
| 3,478,211 | 11/1969 | Moser | 250/84 X |

*Primary Examiner*—Archie R. Borchelt
*Attorneys*—Edgar J. Brower and Thomas O. Watson, Jr.

ABSTRACT: An array of bars of aluminum sheet material of triangular cross section to be used as a target for testing infrared or television equipment. The three sides of each bar are painted white, black and alternating black and white stripes with one side heated so as to provide an IR source. In addition, each bar is rotatable about its longitudinal axis so that the target provides for a broad range of light and temperature contrasts.

PATENTED AUG 3 1971  3,597,618

INVENTORS
ROBERT J. JORDAN
RONALD N. PHILLIPS
ROBERT R. SHATZER

BY Thomas O. Watson Jr.

ATTORNEY 3,597,618

GROUND BASE TARGET FOR TESTING ELECTRO-OPTICAL SENSORS IN THE INFRARED AND VISIBLE RANGE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to ground based targets for testing electrooptical sensors and, more particularly, to a new and improved target for testing airborne television and infrared sensors.

2. Description of the Prior Art

In the field of testing and evaluating airborne equipment, it has been the general practice to employ multiple targets to test electrooptical sensors such as television and infrared sensors. Such targets have served their purpose but serious difficulties have been encountered since many targets were required to test airborne electrooptical equipment and these targets were not capable of quick modification to change their characteristics so as to provide more data for analyzation.

SUMMARY OF THE INVENTION

The general purpose of the invention is to provide a versatile ground based target that has all the advantages of similarly employed targets and has none of the above described disadvantages. To attain this end, the present invention provides for a ground based target consisting of an array of triangular shaped bars of aluminum sheet material mounted on a support. The three sides of each bar are painted white, black, and alternate black and white stripes. Each bar is rotatable about its axis so as to provide a wide variety of targets to the airborne sensors. The white side of the bar serves as a infrared source, when heater strips embedded behind its aluminum face are turned on.

OBJECTS OF THE INVENTION

It is a primary object of the present invention to provide a versatile ground based target for testing airborne electrooptical sensors capable of quick modification.

Another object is to provide a ground based target capable of functioning as many targets.

A still further object is to provide a target having a broad range of light and temperature contrasts that can be used as a TV and IR target.

A still further object is to provide an accurate, quantitative, controllable target for testing electro-optical sensors.

Other objects, advantages and novel features of the invention will become apparent from the following detailed description of the invention when considered in conjunction with the accompanying drawing.

DESCRIPTION OF THE PREFERRED EMBODIMENTS

Figure 1:
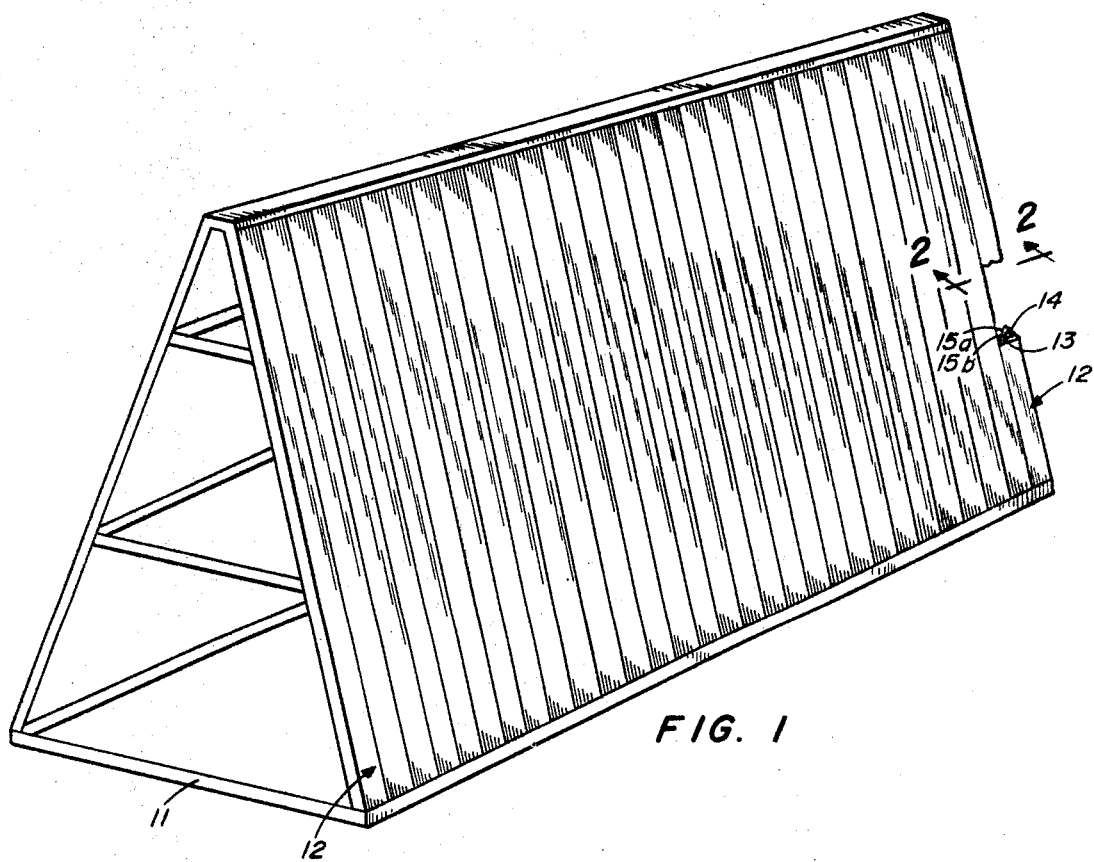
FIG. 1 shows a perspective view, partly in section, of a preferred embodiment of the invention.

FIG. 1, which illustrates a preferred embodiment of the ground based target, shows an array of thirty triangularly shaped bars 12 separately mounted at their ends on support 11. Each bar is constructed of aluminum sheet material and is rotatable about its longitudinal axis. The preferred dimensions of the bar are one foot wide on a side and a length of 20 feet.

Figure 2:
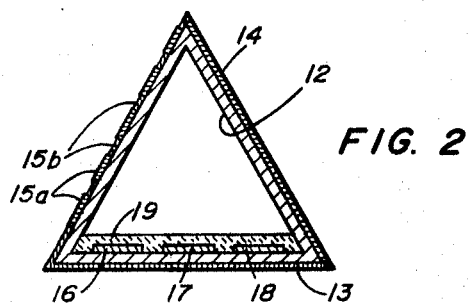
FIG. 2 is a sectional view of one bar along the section line 2-2 of FIG. 1.

FIG. 2 illustrates a section view of one bar. Side 13 of the bar 12 is painted white, side 14 black, with the third side alternately painted with black 15a, and white 15b, stripes. Attached to the white side 13 behind the aluminum facing are heater strips 16, 17 and 18 which heat the white side with insulating material 19 shielding the other sides of the bar from the heat. The bar is closed at both ends so as to facilitate attachment to support 11 by any well known means such as shafts (not shown).

In operation, when testing airborne television equipment, any combination of bars can be arranged as the target merely by separately rotating the bars 12 to the desired configuration. Rotation can be done manually or automatically. Similarly, when testing infrared equipment, heater strips 16, 17 and 18 are heated by a source (not shown) and the white face 13 of the bar will act as an infrared source. Another possible use for this array is to have all the black sides face forward to act as a projection target for testing airborne equipment.

Obviously many modifications and variations of the present invention are possible in the light of the above teachings.

I claim:

1. A target for testing electro-optical sensors, comprising:
   a frame; and
   a plurality of bars mounted for independent rotation on said frame, each of said bars having more than one functional side and each of said functional sides having a different coloring from any adjacent functional side on the same bar;
   whereby various target patterns can be created by selective rotation of the bars to position a selected one of said functional sides in a stationary functional position.

2. The target of claim 1 wherein each of said bars is constructed from aluminum sheet material.

3. The target of claim 1 further comprising a heating means within each of said bars for providing an infrared target, said heating means being placed behind one of said functional sides.

4. The target of claim 1 wherein said bar has a triangular cross section and three functional sides, the coloring of the functional sides being white, black and white-black striped.

5. The target of claim 4 wherein a heating means is placed behind the white colored side to provide an infrared target.

6. The target of claim 5 wherein each of said bars is constructed from aluminum sheet material.

7. The target of claim 1 wherein the coloring of any functional side on a given bar is different from the coloring of any other functional side on the same bar.

8. The target of claim 7 wherein each bar has a triangular cross section and three functional sides, the coloring of the functional sides being white, black and white-black striped.

9. The target of claim 8 further comprising a heating means placed behind the white functional side to provide an infrared target.

10. The target of claim 9 wherein each bar is constructed from aluminum sheet material.